United States Patent
Mochizuki et al.

(10) Patent No.: US 11,319,187 B2
(45) Date of Patent: May 3, 2022

(54) ELEVATOR CAR POSITION DETECTION DEVICE

(71) Applicant: Mitsubishi Electric Corporation, Tokyo (JP)

(72) Inventors: Keita Mochizuki, Tokyo (JP); Jin Inoue, Tokyo (JP); Masahiro Ishikawa, Tokyo (JP); Akihide Shiratsuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 285 days.

(21) Appl. No.: 16/479,615

(22) PCT Filed: May 10, 2017

(86) PCT No.: PCT/JP2017/017708
§ 371 (c)(1),
(2) Date: Jul. 22, 2019

(87) PCT Pub. No.: WO2018/207286
PCT Pub. Date: Nov. 15, 2018

(65) Prior Publication Data
US 2021/0354954 A1    Nov. 18, 2021

(51) Int. Cl.
*B66B 1/34*    (2006.01)
*G01B 7/00*    (2006.01)

(52) U.S. Cl.
CPC ............ *B66B 1/3492* (2013.01); *G01B 7/003* (2013.01)

(58) Field of Classification Search
CPC ......... B66B 3/02; B66B 1/3492; G01B 7/003; G01D 5/45; G01D 11/245
(Continued)

(56) References Cited

U.S. PATENT DOCUMENTS 5,798,490 A    8/1998   Vairio et al.
5,831,227 A *  11/1998  Finn .................... B66B 1/50
                                              187/394
(Continued)

FOREIGN PATENT DOCUMENTS

CN    1112514 A     11/1995
CN    101472823 A    7/2009
(Continued)

OTHER PUBLICATIONS

International Search Report and Written Opinion dated Aug. 1, 2017 for PCT/JP2017/017708 filed on May 10, 2017, 7 pages including English Translation of the International Search Report.
(Continued)

*Primary Examiner* — Joseph J Hail
*Assistant Examiner* — Shantese L McDonald
(74) *Attorney, Agent, or Firm* — Xsensus LLP (57) ABSTRACT

An elevator car position detection device is provided capable of preventing erroneous detection of a metal object other than an object to be detected. The elevator car position detection device includes: an object to be detected provided in one of a hoistway and a car of an elevator, the object to be detected being formed of a magnetic body and having a slit-like opening; and a magnetic detection device provided in the other of the hoistway and the car of the elevator, the magnetic detection device being configured to detect a change in magnetic flux density according to the slit-like opening when facing the object to be detected.

5 Claims, 5 Drawing Sheets

(58) Field of Classification Search
USPC ......... 187/394, 390, 291; 324/207.2, 207.11, 324/207.21
See application file for complete search history.

(56) References Cited

U.S. PATENT DOCUMENTS 9,193,563 B2 * 11/2015 Arnold .................... B66B 1/50
2013/0043863 A1 * 2/2013 Ausserlechner ....... G01B 13/02
324/207.2

FOREIGN PATENT DOCUMENTS

| CN | 103787164 A | | 5/2014 | |
|----|----|----|----|----|
| EP | 2072443 A1 | | 6/2009 | |
| JP | 2003-149313 A | | 5/2003 | |
| JP | 2006/113039 | * | 4/2006 | ............... G01D 5/14 |
| JP | 2006-113039 A | | 4/2006 | |
| JP | 2009-263108 A | | 11/2009 | |
| JP | 2009-542548 A | | 12/2009 | |
| JP | 2014-112517 A | | 6/2014 | |
| WO | 2008/007445 A1 | | 1/2008 | |
| WO | WO 2008/007445 | * | 1/2008 | ............... B66B 1/36 |
| WO | 2016/067385 A1 | | 5/2016 | |

OTHER PUBLICATIONS

Japanese Office Action dated Apr. 21, 2020, issued in corresponding Japanese Patent Application No. 2019-516795.
Office Action dated Jul. 8, 2020 in Chinese Patent Application No. 201780090367.9, 10 pages.
Office Action dated Jan. 27, 2021, in corresponding Indian patent Application No. 201947042333, 7 pages.
German Office Action dated Feb. 18, 2021 in German patent application No. 112017007520.3.
Korean Office Action dated Mar. 9, 2021 in Korean patent application No. 10-2019-7031986.

* cited by examiner

ELEVATOR CAR POSITION DETECTION DEVICE

CROSS-REFERENCE TO RELATED APPLICATION

The present application is based on PCT filing PCT/JP2017/017708, filed May 10, 2017, the entire contents of which are incorporated herein by reference.

FIELD

The present invention relates to an elevator car position detection device.

BACKGROUND

For example, PTL 1 discloses an elevator car position detection device. The car position detection device detects an object to be detected when a magnetic detection device faces the object to be detected to detect a car position.

CITATION LIST

Patent Literature

[PTL 1] JP2009-263108A

SUMMARY

Technical Problem

However, in the car position detection device described in PTL 1, when the magnetic detection device faces a metal object other than the object to be detected, the magnetic detection device may erroneously detect the metal object as the object to be detected. Thus, to prevent the metal object other than the object to be detected from facing the magnetic detection device, installation positions of other devices are limited.

The present invention is achieved to solve the above described problem. An object of the present invention is to provide an elevator car position detection device capable of preventing erroneous detection of a metal object other than an object to be detected.

Solution to Problem

An elevator car position detection device according to the present invention includes: an object to be detected provided in one of a hoistway and a car of an elevator, the object to be detected being formed of a magnetic body and having a slit-like opening; and a magnetic detection device provided in the other of the hoistway and the car of the elevator, the magnetic detection device being configured to detect a change in magnetic flux density according to the slit-like opening when facing the object to be detected.

Advantageous Effects of Invention

According to the present invention, the magnetic detection device detects the change in magnetic flux density according to the slit-like opening in the object to be detected. This can prevent erroneous detection of a metal object other than the object to be detected.

DESCRIPTION OF EMBODIMENTS

With reference to the accompanying drawings, embodiments of the present invention will be described. In the drawings, the same or corresponding components are denoted by the same reference numerals. Overlapping descriptions of the components will be simplified or omitted.

Embodiment 1

Figure 1:
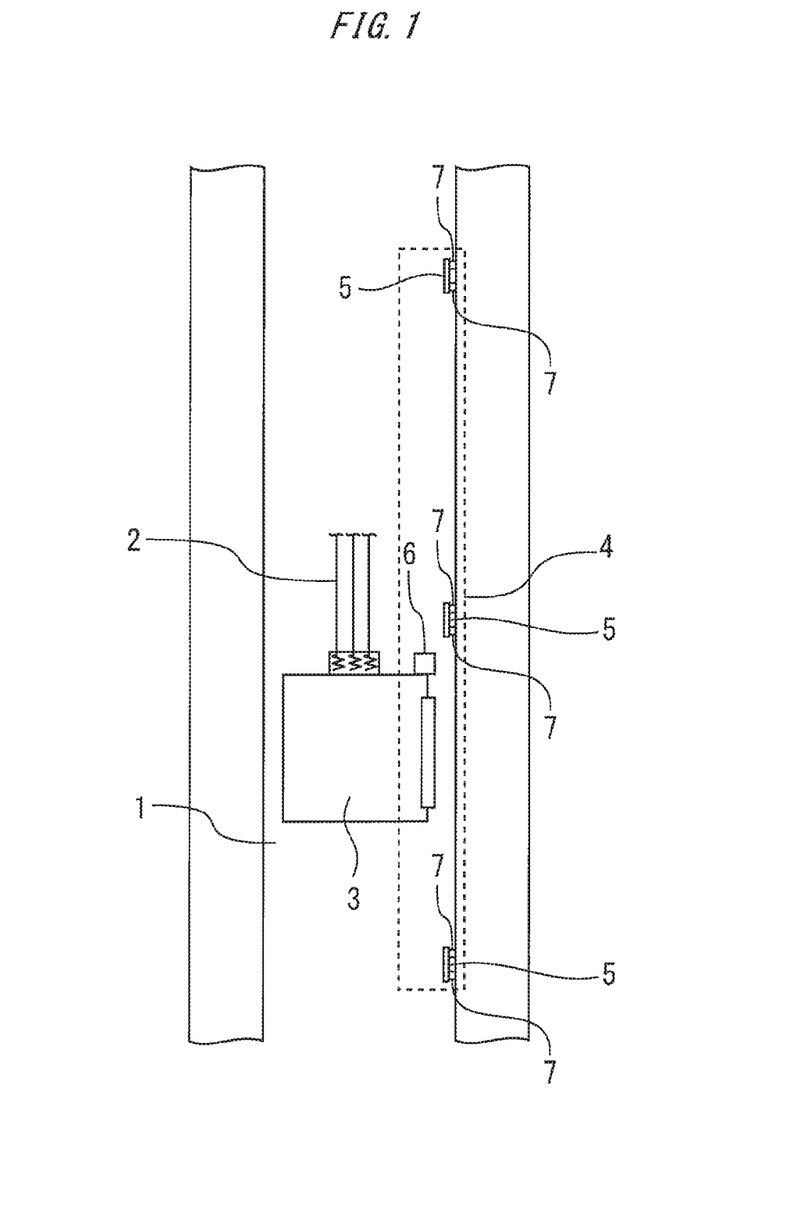
FIG. 1 is a configuration diagram of essential portions of an elevator to which an elevator car position detection device according to Embodiment 1 of the present invention is applied.

FIG. 1 is a configuration diagram of essential portions of an elevator to which an elevator car position detection device according to Embodiment 1 of the present invention is applied.

In an elevator in FIG. 1, a hoistway 1 extends through floors of a building. A traction machine (not shown) is provided in an upper part of the hoistway 1. A drive sheave (not shown) is mounted to a rotating shaft of the traction machine. A main rope 2 is wound around the drive sheave.

A car 3 is provided in the hoistway 1. The car 3 is suspended from one side of the main rope 2. A counterweight (not shown) is provided in the hoistway 1. The counterweight is suspended from the other side of the main rope 2.

A car position detection device 4 includes a plurality of objects to be detected 5 and a magnetic detection device 6. Each of the plurality of objects to be detected 5 is provided on each floor of the building. For example, the plurality of objects to be detected 5 are secured to a wall surface of the hoistway 1 via support members 7. For example, the plurality of objects to be detected 5 are secured to a structure secured to the wall surface of the hoistway 1.

The magnetic detection device 6 is provided on a ceiling of the car 3.

When the traction machine is driven in the elevator, the drive sheave rotates. When the drive sheave rotates, the main rope 2 moves. When the main rope 2 moves, the car 3 and the counterweight move up and down in opposite directions.

At this time, when the magnetic detection device 6 faces the object to be detected 5, the magnetic detection device 6 detects a change in magnetic flux density according to the object to be detected 5.

Next, with reference to FIG. 2, the object to be detected 5 will be described.

Figure 2:
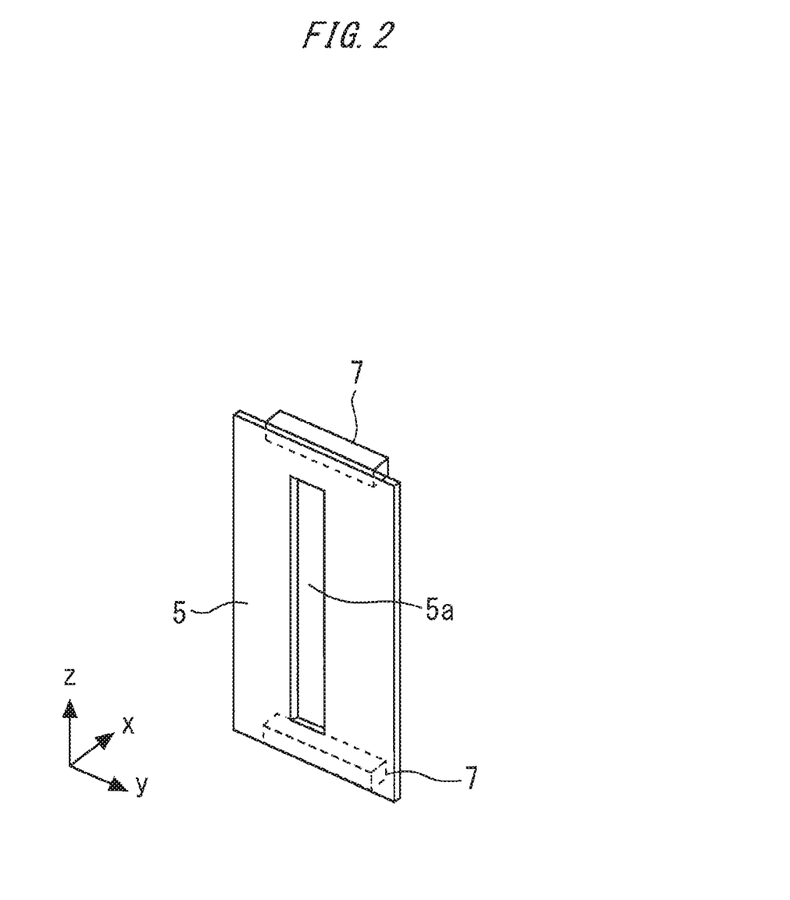
FIG. 2 is a perspective view of an object to be detected of the elevator car position detection device according to Embodiment 1 of the present invention.

FIG. 2 is a perspective view of the object to be detected of the elevator car position detection device according to Embodiment 1 of the present invention.

In FIG. 2, the object to be detected 5 is formed of a magnetic material. For example, the object to be detected 5 is formed of a flat metal plate. For example, the object to be detected 5 is formed of iron. For example, the object to be detected 5 is formed of an iron alloy. For example, the object to be detected 5 is formed of nickel. For example, the object to be detected 5 is formed of permalloy. For example, the object to be detected 5 is formed of silicon steel sheet.

The object to be detected 5 has a slit-like opening 5a with a small width in a y direction. The object to be detected 5 is arranged with a gap in an x direction from a position to which the object to be detected 5 is secured via the support member 7.

Next, with reference to FIG. 3, the magnetic detection device 6 will be described.

Figure 3:
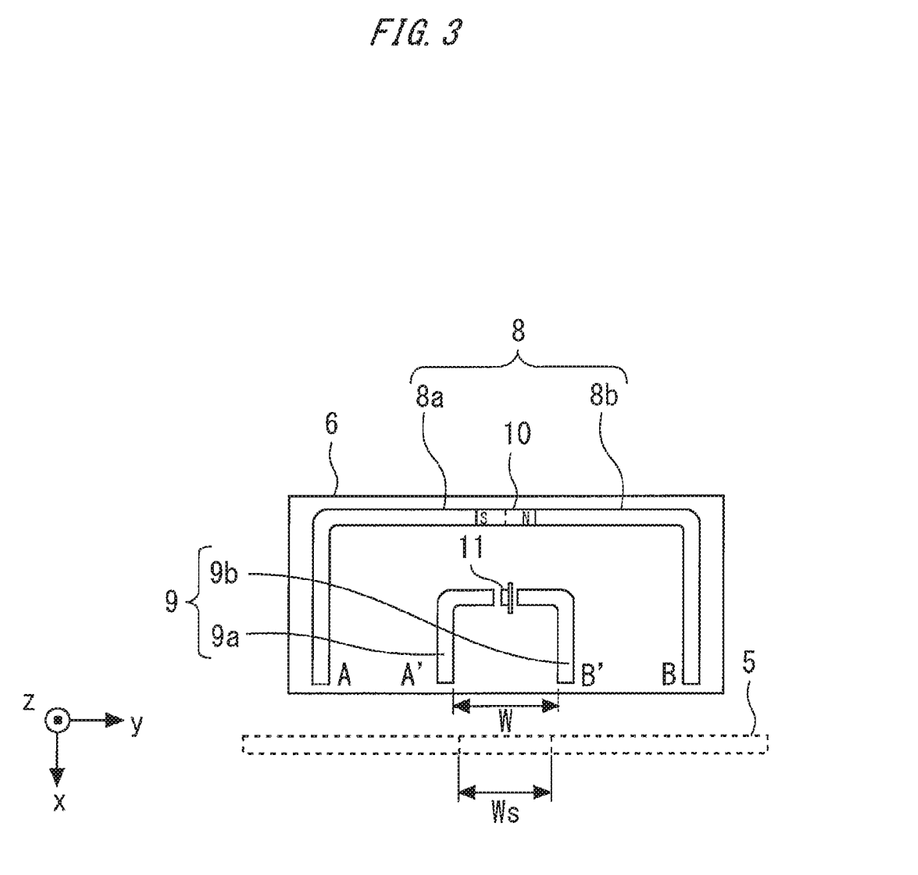
FIG. 3 is a plan view of a magnetic detection device of the elevator car position detection device according to Embodiment 1 of the present invention.

FIG. 3 is a plan view of the magnetic detection device of the elevator car position detection device according to Embodiment 1 of the present invention.

As shown in FIG. 3, a circuit board of the magnetic detection device 6 includes a first magnetic body portion 8, a second magnetic body portion 9, a magnet portion 10, and a magnetic sensor portion 11.

For example, the first magnetic body portion 8 is formed of a magnetic material. For example, the first magnetic body portion 8 is formed of a flat metal plate. For example, the first magnetic body portion 8 is formed of iron. For example, the first magnetic body portion 8 is formed of an iron alloy. For example, the first magnetic body portion 8 is formed of nickel. For example, the first magnetic body portion 8 is formed of permalloy. For example, the first magnetic body portion 8 is formed of silicon steel sheet.

For example, the first magnetic body portion 8 is formed into a U shape. The first magnetic body portion 8 opens toward the object to be detected 5. Opposite ends of the first magnetic body portion 8 are arranged on opposite sides of the slit-like opening 5a in the object to be detected 5 when the first magnetic body portion 8 faces the object to be detected 5.

For example, the first magnetic body portion 8 includes a first arm 8a and a second arm 8b. An end A of the first arm 8a is directed in the x direction. An end B of the second arm 8b is directed in the x direction.

For example, the second magnetic body portion 9 is formed of a magnetic material. For example, the second magnetic body portion 9 is formed of a flat metal plate. For example, the second magnetic body portion 9 is formed of iron. For example, the second magnetic body portion 9 is formed of an iron alloy. For example, the second magnetic body portion 9 is formed of nickel. For example, the second magnetic body portion 9 is formed of permalloy. For example, the second magnetic body portion 9 is formed of silicon steel sheet.

For example, the second magnetic body portion 9 is formed into a U shape. The second magnetic body portion 9 opens toward the object to be detected 5. The second magnetic body portion 9 is provided inside the first magnetic body portion 8. Opposite ends of the second magnetic body portion 9 are arranged on opposite sides of the slit-like opening 5a in the object to be detected 5 when the second magnetic body portion 9 faces the object to be detected 5.

For example, the second magnetic body portion 9 includes a first arm 9a and a second arm 9b. An end A' of the first arm 9a is directed in the x direction. An end B' of the second arm 9b is directed in the x direction. A width W between the end A' of the first arm 9a and the end B' of the second arm 9b is set to be equal to or larger than a width Ws of the slit-like opening 5a in the object to be detected 5.

For example, the magnet portion 10 is formed of a permanent magnet. For example, the magnet portion 10 is formed of a ferrite magnet. For example, the magnet portion 10 is formed of a neodymium magnet. For example, the magnet portion 10 is formed of a samarium-cobalt magnet. For example, the magnet portion 10 is formed of a plastic magnet containing at least one of the ferrite magnet, the neodymium magnet, and the samarium-cobalt magnet.

A south pole of the magnet portion 10 is connected to an end opposite to the end A of the first arm 8a of the first magnetic body portion 8. A north pole of the magnet portion 10 is connected to an end opposite to the end B of the second arm 8b of the first magnetic body portion 8.

For example, the magnetic sensor portion 11 is provided so as to be able to detect a change in magnetic flux density. For example, the magnetic sensor portion 11 is formed of a Hall element. For example, the magnetic sensor portion 11 is formed of an anisotropic magnetoresistive sensor. For example, the magnetic sensor portion 11 is formed of a giant magnetoresistive sensor. For example, the magnetic sensor portion 11 is formed of a tunnel magnetoresistive sensor. For example, the magnetic sensor portion 11 is formed of a flux gate sensor. For example, the magnetic sensor portion 11 is formed of a magnetoimpedance sensor.

The magnetic sensor portion 11 is provided between an end opposite to the end A' of the first arm 9a of the second magnetic body portion 9 and an end opposite to the end B' of the second arm 9b of the second magnetic body portion 9.

Next, with reference to FIG. 4, a detection principle of the object to be detected 5 will be described.

Figure 4:
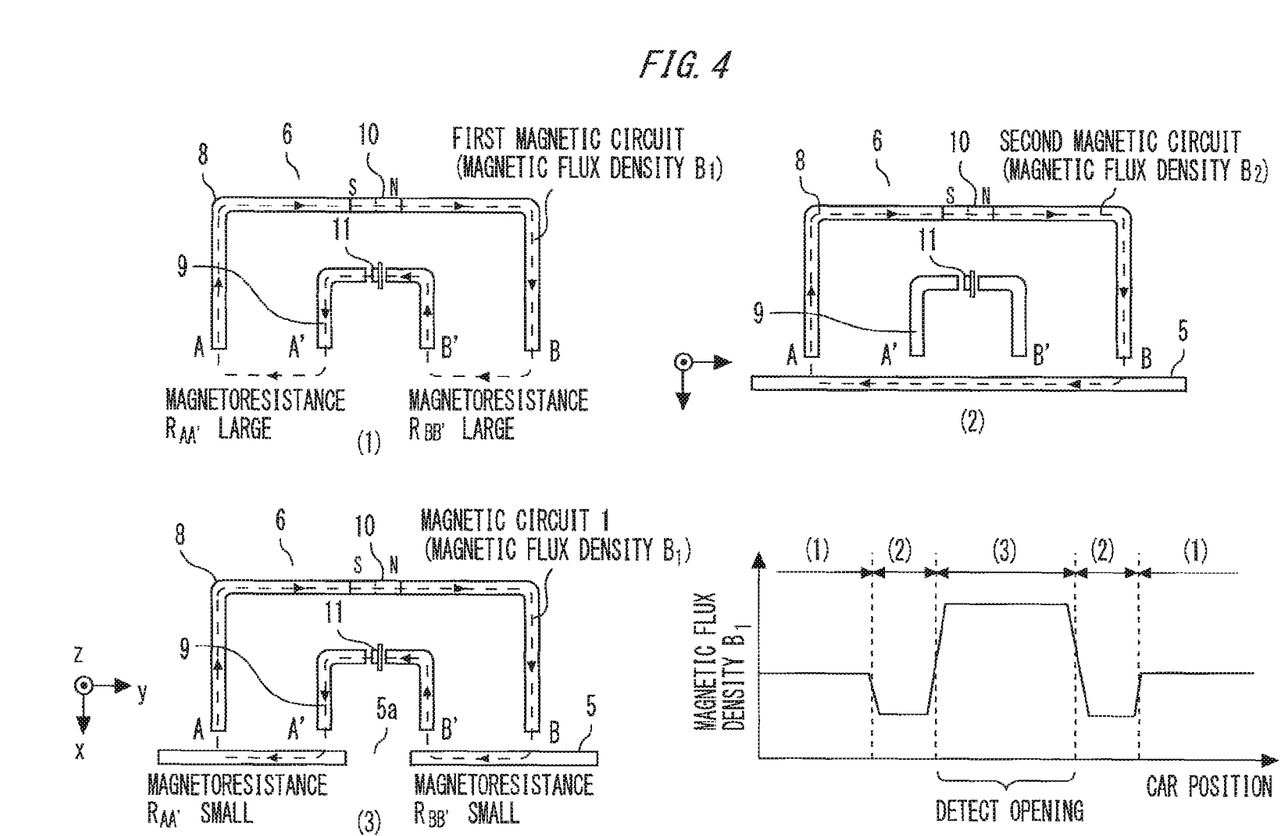
FIG. 4 illustrates a detection principle of the object to be detected of the elevator car position detection device according to Embodiment 1 of the present invention.

FIG. 4 illustrates the detection principle of the object to be detected of the elevator car position detection device according to Embodiment 1 of the present invention.

The magnetic sensor portion 11 detects a magnetic flux density $B_1$ of a first magnetic circuit formed to pass through between the end A of the first magnetic body portion 8 and the end A' of the second magnetic body portion 9 and then through between the end B of the first magnetic body portion 8 and the end B' of the second magnetic body portion 9.

In this case, the magnetic flux density $B_1$ increases with decreasing magnetoresistance $R_{AA'}$ between the end A of the first magnetic body portion 8 and the end A' of the second magnetic body portion 9 and decreasing magnetoresistance $R_{BB'}$ between the end B of the first magnetic body portion 8 and the end B' of the second magnetic body portion 9.

For example, as shown in FIG. 4(1), when the magnetic detection device 6 does not face the object to be detected 5, air exists between the end A of the first magnetic body portion 8 and the end A' of the second magnetic body portion 9 and between the end B of the first magnetic body portion 8 and the end B' of the second magnetic body portion 9. Thus, the magnetoresistance $R_{AA'}$ and the magnetoresistance $R_{BB'}$ increase. As a result, the magnetic flux density $B_1$ of the first magnetic circuit decreases.

For example, as shown in FIG. 4(2), when the magnetic detection device 6 faces the object to be detected 5 and has not reached the slit-like opening 5a, the magnetoresistance between the end A of the first magnetic body portion 8 and the end B of the first magnetic body portion 8 decreases. Thus, a magnetic flux density $B_2$ of a second magnetic circuit which does not pass through the second magnetic body portion 9 increases. As a result, the magnetic flux density $B_1$ of the first magnetic circuit relatively decreases.

A shape of the first magnetic body portion 8, a shape of the second magnetic body portion 9, a shape of the object to be detected 5, and a passing position of the object to be detected 5 are adjusted so that the magnetic flux density $B_1$ of the first magnetic circuit in FIG. 4(2) is lower than the magnetic flux density $B_1$ of the first magnetic circuit in FIG. 4(1).

For example, as shown in FIG. 4(3), when the magnetic detection device 6 faces the object to be detected 5 and has reached the slit-like opening 5*a*, the object to be detected 5 magnetically connects between the end A of the first magnetic body portion 8 and the end A' of the second magnetic body portion 9 and between the end B of the first magnetic body portion 8 and the end B' of the second magnetic body portion 9. Thus, the magnetoresistance $R_{AA'}$ and the magnetoresistance $R_{BB'}$ decrease.

In this case, air from the slit-like opening 5*a* in the object to be detected 5 exists between the end A of the first magnetic body portion 8 and the end B of the first magnetic body portion 8. Thus, the magnetoresistance increases between the end A of the first magnetic body portion 8 and the end B of the first magnetic body portion 8. As a result, the second magnetic circuit is closed.

For example, as shown in a lower right side in FIG. 4, when the position of the car 3 changes, the magnetic flux density $B_1$ also changes. The magnetic sensor portion 11 detects the change in magnetic flux density $B_1$. As a result, the car 3 is accurately detected.

According to Embodiment 1 described above, the magnetic detection device 6 detects the change in magnetic flux density according to the slit-like opening 5*a* in the object to be detected 5. Thus, as long as there is no metal object having an opening similar to the slit-like opening 5*a* in the position that the magnetic detection device 6 faces, erroneous detection of a metal object other than the object to be detected 5 can be prevented. This can ensure high flexibility in installation positions of other devices.

Specifically, the magnetic detection device 6 includes the first magnetic body portion 8, the second magnetic body portion 9, the magnet portion 10, and the magnetic sensor portion 11. Thus, erroneous detection of a metal object other than the object to be detected 5 can be prevented by a simple configuration.

Embodiment 2

Figure 5:
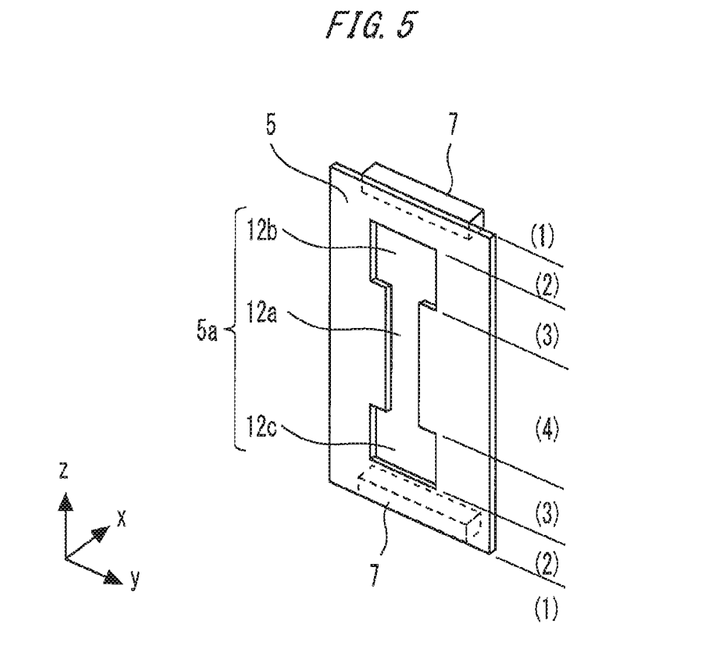
FIG. 5 is a perspective view of an object to be detected of an elevator car position detection device according to Embodiment 2 of the present invention.

FIG. 5 is a perspective view of an object to be detected of an elevator car position detection device according to Embodiment 2 of the present invention. The same or corresponding components as or to those in Embodiment 1 are denoted by the same reference numerals. Descriptions of the components will be omitted.

An object to be detected 5 in Embodiment 2 includes a plurality of slit portions. For example, the object to be detected 5 includes a first slit portion 12*a*, a second slit portion 12*b*, and a third slit portion 12*c*.

The first slit portion 12*a* has a preset width Ws1.

The second slit portion 12*b* is continuously formed over the first slit portion 12*a*. The second slit portion 12*b* has a width Ws2 larger than the width Ws1.

The third slit portion 12*c* is continuously formed under the first slit portion 12*a*. The second slit portion 12*b* has a width Ws3 larger than the width Ws1. For example, the width Ws3 is equal to the width Ws2.

Next, with reference to FIG. 6, a detection state of the object to be detected 5 will be described.

Figure 6:
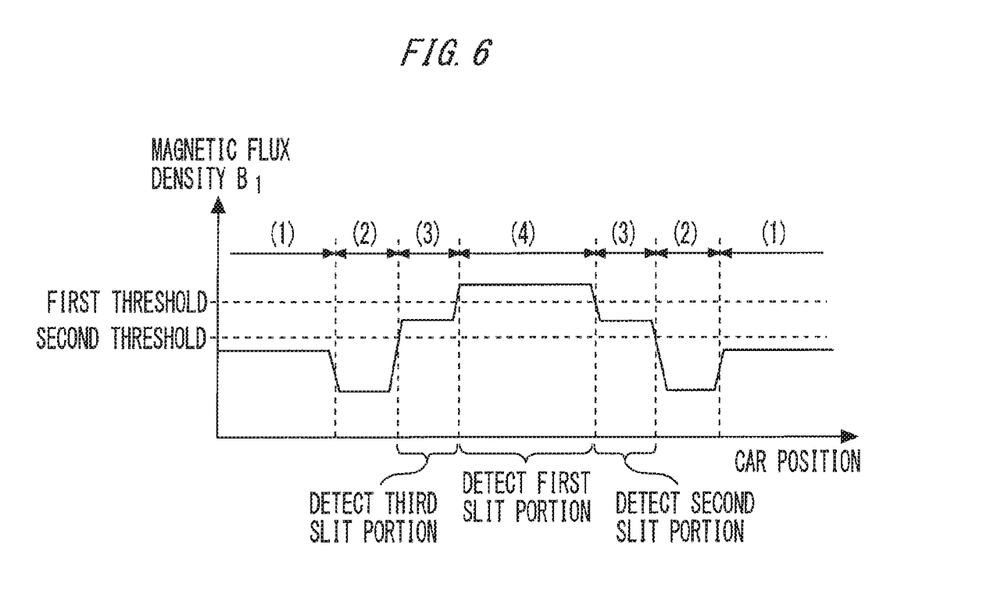
FIG. 6 illustrates a detection state of the object to be detected using the elevator car position detection device according to Embodiment 2 of the present invention.

FIG. 6 shows the detection state of the object to be detected using the elevator car position detection device according to Embodiment 2 of the present invention.

As shown in FIG. 6, a magnetic detection device 6 detects the first slit portion 12*a* when an output signal of a magnetic sensor portion 11 is larger than a first threshold. The magnetic detection device 6 detects the second slit portion 12*b* or the third slit portion 12*c* when the output signal of the magnetic sensor portion 11 is larger than a second threshold and smaller than the first threshold.

For example, a detection range of the first slit portion 12*a* is set to a releveling zone as a reference for determining whether or not a floor surface of a car 3 needs to be adjusted to a floor surface of a hall. For example, detection ranges of the second slit portion 12*b* and the third slit portion 12*c* are set to a door zone as a reference for determining whether or not a door of the car 3 can be opened.

According to Embodiment 2 described above, the object to be detected 5 includes the plurality of slit portions having the different widths as a slit-like opening 5*a*. Specifically, the plurality of slit portions includes the first slit portion 12*a*, the second slit portion 12*b*, and the third slit portion 12*c*. Thus, the position of the car 3 can be more accurately detected.

The third slit portion 12*c* has the width equal to that of the second slit portion 12*b*. Thus, the releveling zone and the door zone required for controlling the elevator can be easily set.

The object to be detected 5 and the magnetic detection device 6 may be interchanged. In this case, the object to be detected 5 is provided on the car 3. The magnetic detection device 6 is provided in the hoistway 1. Also in this case, erroneous detection of a metal object other than the object to be detected 5 can be prevented.

The magnet portion 10 and the magnetic sensor portion 11 may be interchanged. In this case, the magnet portion 10 is provided on the second magnetic body portion 9. The magnetic sensor portion 11 detects a magnetic flux passing through the first magnetic body portion 8. Also in this case, erroneous detection of a metal object other than the object to be detected 5 can be prevented.

INDUSTRIAL APPLICABILITY

As described above, the elevator car position detection device according to the present invention can be applied to a system for preventing erroneous detection of a metal object other than an object to be detected.

REFERENCE SIGNS LIST 1 hoistway
2 main rope
3 car
4 car position detection device
5 object to be detected
5*a* opening
6 magnetic detection device
7 support member
8 first magnetic body portion
8*a* first arm
8*b* second arm
9 second magnetic body portion
9*a* first arm
9*b* second arm
10 magnet portion
11 magnetic sensor portion
12*a* first slit portion 12b second slit portion
12c third slit portion

The invention claimed is:

1. An elevator car position detection device comprising:
an object to be detected provided in one of a hoistway and a car of an elevator, the object to be detected being formed of a magnetic body and having a slit-like opening; and
a magnetic detector provided in the other of the hoistway and the car of the elevator, the magnetic detector being configured to detect a change in magnetic flux density according to the slit-like opening when facing the object to be detected,
wherein the magnetic detector includes:
a first magnetic body portion opening toward the object to be detected, opposite ends of the first magnetic body portion being arranged on opposite sides of the slit-like opening when the first magnetic body portion faces the object to be detected;
a second magnetic body portion provided inside the first magnetic body portion, the second magnetic body portion opening toward the object to be detected, opposite ends of the second magnetic body portion being arranged on opposite sides of the slit-like opening when the second magnetic body portion faces the object to be detected;
a magnet portion connected to one of the first magnetic body portion and the second magnetic body portion; and
a magnetic sensor configured to detect a magnetic flux passing through the other of the first magnetic body portion and the second magnetic body portion.

2. The elevator car position detection device according to claim 1, wherein the object to be detected includes a plurality of slit portions having different widths as the slit-like opening.

3. The elevator car position detection device according to claim 2, wherein the plurality of slit portions includes:
a first slit portion having a preset width;
a second slit portion formed over the first slit portion, the second slit portion having a larger width than the first slit portion; and
a third slit portion formed under the first slit portion, the third slit portion having a larger width than the first slit portion.

4. The elevator car position detection device according to claim 3, wherein the third slit portion has a width equal to the width of the second slit portion.

5. An elevator car position detection device comprising:
an object to be detected provided in one of a hoistway and a car of an elevator, the object to be detected being formed of a magnetic body and having a slit-like opening; and
a magnetic detector provided in the other of the hoistway and the car of the elevator, the magnetic detector being configured to detect a change in magnetic flux density according to the slit-like opening when facing the object to be detected,
wherein the object to be detected includes a plurality of slit portions having different widths as the slit-like opening,
wherein the plurality of slit portions includes:
a first slit portion having a preset width;
a second slit portion formed over the first slit portion, the second slit portion having a larger width than the first slit portion; and
a third slit portion formed under the first slit portion, the third slit portion having a larger width than the first slit portion, and
wherein the third slit portion has a width equal to the width of the second slit portion.

* * * * *